J. PLOEN.
HARROW ATTACHMENT FOR PLANTERS.
APPLICATION FILED AUG. 16, 1909.
968,976.
Patented Aug. 30, 1910.
2 SHEETS—SHEET 2.
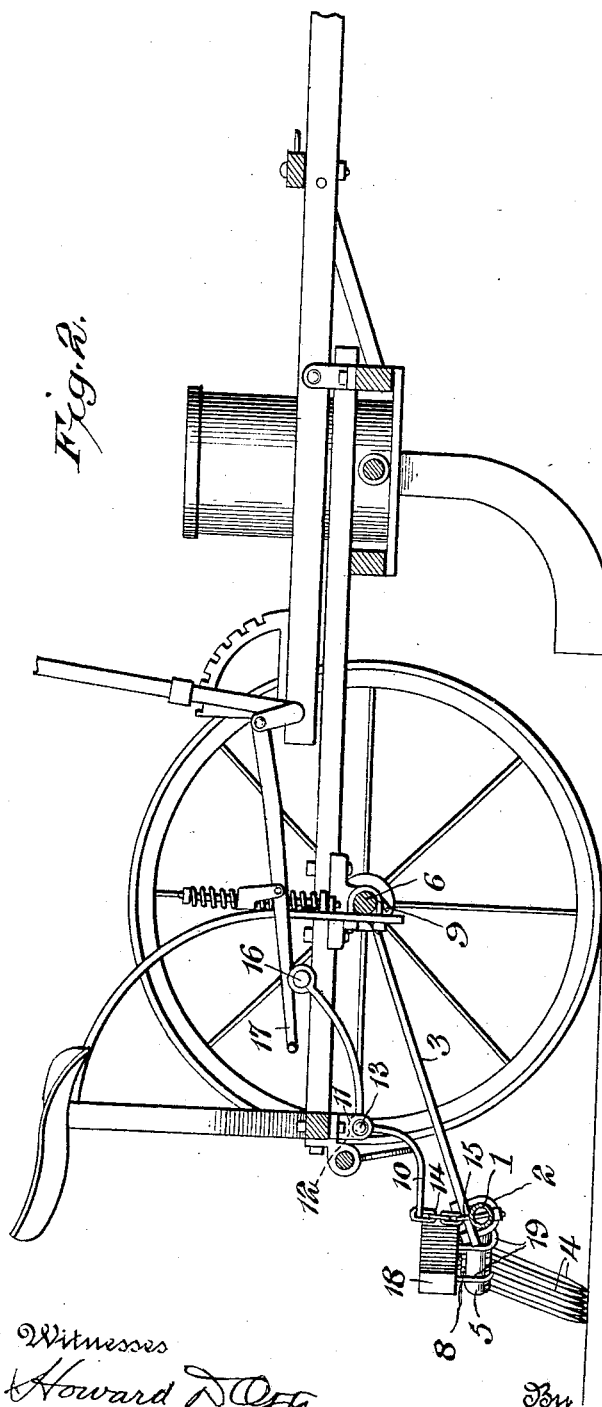
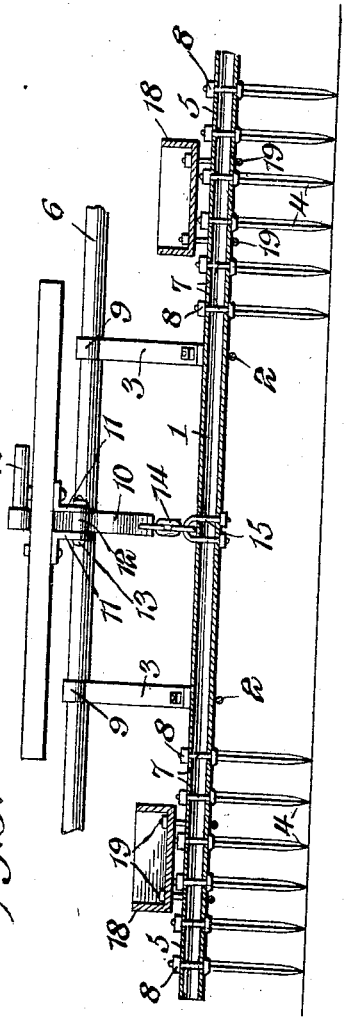
Witnesses
Howard
H. F. Riley
Inventor,
Jochim Ploen,
By E. G. Siggers
Attorney

UNITED STATES PATENT OFFICE.

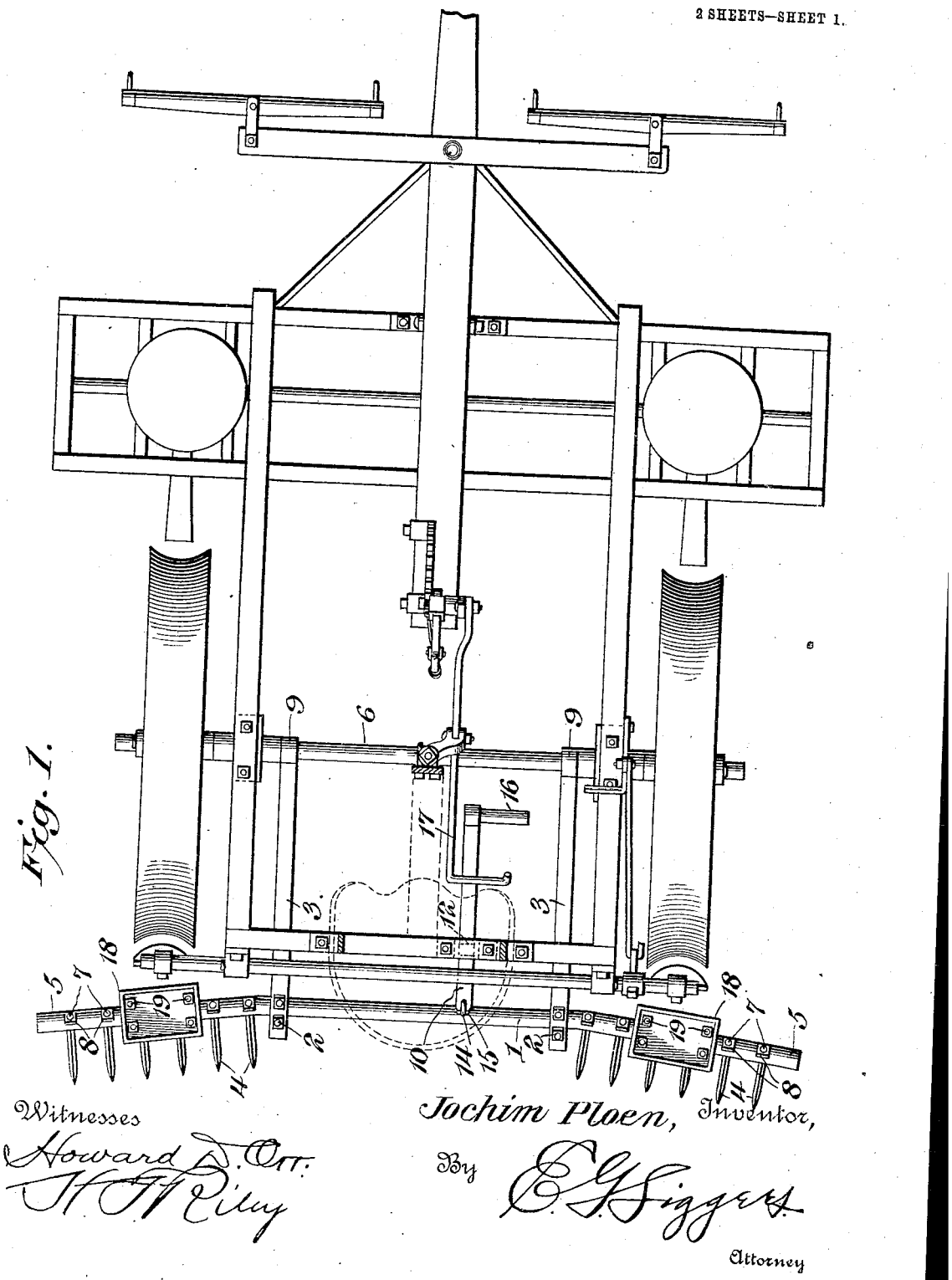

JOCHIM PLOEN, OF MANNING, IOWA.

HARROW ATTACHMENT FOR PLANTERS.

968,976.   Specification of Letters Patent.   Patented Aug. 30, 1910.

Application filed August 16, 1909. Serial No. 513,133.

*To all whom it may concern:*

Be it known that I, JOCHIM PLOEN, a citizen of the United States, residing at Manning, in the county of Carroll and State of Iowa, have invented a new and useful Harrow Attachment for Planters, of which the following is a specification.

The invention relates to a harrow attachment for planters.

The object of the present invention is to improve the construction of harrow attachments for planters, and to provide a simple, inexpensive and efficient device of this character, adapted to be readily applied to a planter, and capable of effectually harrowing the soil in rear of the planter simultaneously with the operation of the latter, thereby obviating the necessity of going over the ground with a harrow after the planter.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a plan view of a harrow attachment, constructed in accordance with this invention, and shown applied to a planter. Fig. 2 is a longitudinal sectional view of the same. Fig. 3 is a detail view of the attachment, the tooth-carrying or harrow bar being in section.

Like numerals of reference designate corresponding parts in all the figures of the drawings.

The harrow attachment comprises in its construction a tooth-carrying or harrow bar 1, preferably constructed of tubular metal and presenting round portions to clips 2 of connecting bars 3, whereby the tooth-carrying or harrow bar 1 is capable of rotary axial adjustment within the clips 2 to arrange the harrow teeth 4 at the desired angle. The round harrow bar 1 has its end portions 5 slightly bent and extended outwardly and rearwardly at an obtuse angle to the intermediate portion, which is arranged in parallelism with the axle 6 of the planter. The harrow teeth 4, which are arranged at intervals along the angularly bent portion 5, are preferably provided with upper attaching shanks 7, piercing the bar 1 and secured to the same by nuts 8, or other suitable fastening means.

The connecting bars 3, which are constructed of suitable metal, extend downwardly and rearwardly from the axle and are provided at their front ends with terminal hook-shaped portions 9, embracing the axle and forming a hinge connection between the same and the bars 3 to permit the harrow attachment to be raised and lowered. The hook-shaped terminals 9 are sufficiently resilient to enable them to be readily sprung into and out of engagement with the rear axle, whereby the device may be readily attached to and removed from the planter. However, a bolt or other suitable fastening device may be employed for securing the upper terminal of the connecting bar to the body portion thereof to prevent the hook-shaped portion from spreading.

The harrow attachment may be raised from the ground by means of a lever 10, constructed of suitable metal and fulcrumed at an intermediate point beneath the rear transverse bar of the frame between brackets 11. The metal of the bar is preferably bent to form an eye 12 for the reception of the pivot bolt 13, which pierces the brackets 11, but any other form of eye may be employed, and the brackets are preferably L-shaped having depending supporting portions, as clearly shown in Fig. 3 of the drawings. The rear arm of the lever 10 is connected by a short chain 14 with the harrow bar by means of a U-shaped bolt 15, or other suitable means, the chain 14 constituting a flexible connection between the harrow bar and the lifting lever to permit independent movement of the harrow attachment with respect to the planter. The front arm of the lever 10 is provided with a laterally projecting foot-receiving portion 16, adapted to be engaged by the foot of the operator, and the said front arm also extends beneath the foot lever 17 of the planter controlling mechanism, whereby, when the planting mechanism is lifted out of the ground, the harrow attachment will also be elevated to enable the machine to be turned at the ends of a row and to be transported from one place or field to another.

The harrow attachment is equipped with weight receptacles 18, preferably consisting of boxes open at the top and secured by clips 19, or other suitable fastening means to the harrow bar and seated upon the shanks of the adjacent harrow teeth. These boxes are designed to receive stone, sand, or other heavy objects for causing the harrow teeth to penetrate the soil.

Having thus fully described my invention, what I claim as new and desire to secure by Letters Patent, is:—

1. A harrow attachment for planters including a transversely disposed harrow bar provided at its end portions with teeth, and spaced connecting bars receiving the intermediate portion of the harrow bar at their rear ends and provided at their front ends with means for connecting the harrow bar with a planter, said harrow bar presenting round portions to the connecting bars and capable of rotary adjustment to set the teeth at different angles.

2. A harrow attachment for planters including connecting bars provided with means for securing them to a planter, clips piercing the connecting bars, and a transversely disposed harrow bar provided at its end portions with teeth and having its intermediate portion arranged within the clips and capable of rotary adjustment to set the teeth at the desired angle or inclination, said clips serving to secure the teeth in their adjustment.

3. A harrow attachment for planters including a transversely disposed harrow bar composed of a straight intermediate portion arranged at right angles to the line of draft, and terminal portions deflected rearwardly and arranged at an angle to the intermediate portion of the harrow bar and provided at intervals with harrow teeth, and means connected with the intermediate portion of the harrow bar for attaching the same to a planter, said means permitting an axial movement of the harrow bar to arrange the teeth at different angles.

4. The combination with a planter having operating mechanism including a foot lever, a harrow attachment having spaced longitudinal bars provided at their front ends with means for hinging them to the planter, a longitudinal lever located at the space between the longitudinal bars and fulcrumed at a point intermediate of its ends to form front and rear arms, the front arm being provided with a foot receiving portion and arranged beneath and adapted to be engaged by the foot lever of the planter, and a flexible connection extending from the rear arm of the longitudinal lever to the harrow attachment and connected with the same at a point between the longitudinal bars thereof.

5. A harrow attachment for planters including a transverse harrow bar provided at its end portions with teeth, spaced connecting bars secured to the harrow bar and having means for hinging them to a planter, operating mechanism for raising and lowering the harrow bar connected with the latter between the said connecting bars, weight receptacles arranged upon the harrow bar and located above the harrow teeth, and clips embracing the harrow bar and piercing the bottom of the weight receptacles.

6. A harrow attachment for planters including spaced longitudinal connecting bars, clips piercing the connecting bars and forming bearings, a transversely disposed harrow bar provided at its end portions with teeth and arranged in the said clips and adjustably secured by the same to the connecting bars, said harrow bar being capable of rotary adjustment to set the teeth at the desired angle or inclination, and weight receptacles arranged above the end portions of the harrow bar and having clips piercing the bottoms of the weight receptacles and embracing the end portions of the harrow bar and adjustably connecting the said receptacles to the harrow bar, whereby the inclination of the teeth may be changed without tilting the receptacles.

7. A harrow attachment for planters including a transversely disposed harrow bar provided with teeth, means for connecting the harrow bar with the planter, said means permitting a rotary adjustment of the harrow bar to set the teeth at different angles, and weight receptacles mounted upon the terminal portions of the harrow bar and having attaching means adapted to permit rotary adjustment of the harrow bar, whereby the inclination of the teeth may be changed without tilting the receptacles.

In testimony, that I claim the foregoing as my own, I have hereto affixed my signature in the presence of two witnesses.

JOCHIM PLOEN.

Witnesses:
E. J. MILLER,
E. D. SUTHERLAND.